(12) United States Patent
Kirkman et al.

(10) Patent No.: US 11,289,890 B2
(45) Date of Patent: Mar. 29, 2022

(54) METHOD FOR OPERATING AN ELECTRICAL NETWORK

(71) Applicant: SIEMENS AKTIENGESELLSCHAFT, Munich (DE)

(72) Inventors: Robert Kirkman, Altdorf (DE); Rainer Krebs, Erlangen (DE)

(73) Assignee: Siemens Aktiengesellschaft, Munich (DE)

(*) Notice: Subject to any disclaimer, the term of this patent is extended or adjusted under 35 U.S.C. 154(b) by 409 days.

(21) Appl. No.: 16/523,428

(22) Filed: Jul. 26, 2019

(65) Prior Publication Data

US 2020/0036179 A1 Jan. 30, 2020

(30) Foreign Application Priority Data

Jul. 26, 2018 (EP) .................................... 18185716

(51) Int. Cl.
*H02H 7/00* (2006.01)
*H02H 1/00* (2006.01)
*H02H 7/26* (2006.01)

(52) U.S. Cl.
CPC ........ *H02H 1/0092* (2013.01); *H02H 1/0061* (2013.01); *H02H 7/26* (2013.01)

(58) Field of Classification Search
None
See application file for complete search history.

(56) References Cited

U.S. PATENT DOCUMENTS

| 7,995,314 B2 * | 8/2011 | Titus ........................ H02H 3/04 361/42 |
|---|---|---|
| 2009/0149972 A1 | 6/2009 | Adib |
| 2014/0108851 A1 | 4/2014 | Ishchenko et al. |

* cited by examiner

*Primary Examiner* — Stephen W Jackson
(74) *Attorney, Agent, or Firm* — Laurence A. Greenberg; Werner H. Stemer; Ralph E. Locher

(57) ABSTRACT

A method operates an electrical network, in particular a power supply network or power distribution network, in which protective apparatuses are connected to a multiplicity of measurement positions. The protective apparatuses monitor an assigned network section of the electrical network and are respectively parameterized with at least one apparatus-side parameter value which influences the mode of operation of the respective protective apparatus. Accordingly, the protective apparatuses are remotely readable and are connected to a superordinate central device, and the central device reads out the apparatus-side parameter values from the protective apparatuses.

14 Claims, 5 Drawing Sheets

FIG 3

METHOD FOR OPERATING AN ELECTRICAL NETWORK

CROSS-REFERENCE TO RELATED APPLICATION

This application claims the priority, under 35 U.S.C. § 119, of European application EP 18185716.0, filed Jul. 26, 2018; the prior application is herewith incorporated by reference in its entirety.

BACKGROUND OF THE INVENTION

Field of the Invention

The invention relates to a method for operating an electrical network, in which protective apparatuses are connected to a multiplicity of measurement positions, which apparatuses monitor an assigned network section of the electrical network and are respectively parameterized with at least one apparatus-side parameter value which influences the mode of operation of the respective protective apparatus.

In electrical power supply networks or power distribution networks, the problem often arises that protective apparatuses are parameterized incorrectly or at least not optimally. Incorrectly or poorly parameterized protective apparatuses may endanger the stability of the network to a considerable degree, for example because a not strictly necessary shutdown of a network section because of overload thereby occurring in neighboring network sections may lead to a cascaded shutdown of further network sections and, in the worst case, the shutdown of the entire network; the latter case is also referred to in the art as "blackout".

SUMMARY OF THE INVENTION

The object of the invention is to provide a method for operating an electrical network, which operates better than previously known methods in respect of the parameterization of protective apparatuses.

This object is achieved according to the invention by a method having the features of the independent method claim. Advantageous configurations of the method according to the invention are specified in the dependent claims.

Correspondingly, according to the invention, it is provided that the protective apparatuses are remotely readable and are connected to a superordinate central device, and the central device reads out the apparatus-side parameter values from the protective apparatuses.

One essential advantage of the method according to the invention is that the protective apparatuses are remotely readable and can therefore be checked by the central device provided according to the invention in relation to their respective parameterization. A simply incorrect or at least not optimal parameterization may therefore be recognized promptly and corrective measures may be carried out.

According to one alternative embodiment which is regarded as advantageous, it is provided that the central device compares the read-out apparatus-side parameter values with setpoint parameter values for the respective protective apparatuses, and generates an update signal when the read-out parameter values differ from the assigned setpoint parameter values.

It is also advantageous that the protective apparatuses are remotely configurable, and the central device compares the read-out apparatus-side parameter values with setpoint parameter values for the respective protective apparatuses and, in the scope of a remote configuration, replaces those read-out apparatus-side parameter values which differ from the assigned setpoint parameter values with the corresponding setpoint parameter values.

It is also regarded as advantageous that, with the aid of operating data which describe the respective operating state of the electrical network, and with the aid of structure data which describe the technical infrastructure of the electrical network, the central device determines suitable parameter values for the protective apparatuses and transmits the determined suitable parameter values to the protective apparatuses if they differ from the read-out parameter values.

According to one variant of the method which is regarded as particularly advantageous, it is provided that with the aid of operating data which describe the respective operating state of the electrical network, with the aid of structure data which describe the technical infrastructure of the electrical network, and with the aid of the respective apparatus-side parameter values of the protective apparatuses, the central device checks whether—in relation to the respective operating state of the network—there is a network fault, in particular a short circuit, in an arbitrarily predetermined network section and actuation of one or more protective apparatuses assigned to this faulty network section would lead to a cascaded shutdown of fault-free network sections, in particular neighboring fault-free network sections, and if so to what extent.

In the latter variant, it is furthermore advantageous that, when a predetermined extent threshold of the extent of a cascaded shutdown is exceeded, the central device checks whether modified parameter values for the one or more protective apparatuses assigned to the arbitrarily predetermined network section would reduce the extent of the cascaded shutdown, and in the case of a reduction of the extent of the cascaded shutdown, the determined modified parameter values are transmitted to the relevant protective apparatuses for reparameterization.

Furthermore, it is advantageous that, when a predetermined extent threshold of the extent of a cascaded shutdown is exceeded, the central device checks whether modified parameter values for those protective apparatuses which belong to neighboring network sections in relation to the arbitrarily predetermined network section would reduce the extent of the cascaded shutdown, and in the case of a reduction of the extent of the cascaded shutdown, the determined modified parameter values are transmitted to the relevant protective apparatuses for reparameterization.

It is particularly advantageous that, when a predetermined extent threshold of the extent of a cascaded shutdown is exceeded, the central device checks whether modified parameter values for those protective apparatuses which belong to all other network sections of the electrical network would reduce the extent of the cascaded shutdown, and in the case of a reduction of the extent of the cascaded shutdown, the determined modified parameter values are transmitted to the relevant protective apparatuses for reparameterization.

The or at least one of the protective apparatuses assigned to the arbitrarily predetermined network section is preferably an overcurrent protective apparatus, in which the or one of the parameter values defines a threshold current beyond which the overcurrent protective apparatus is actuated. In this case, it is advantageous that the central device—in the case of an increased workload in comparison with a normal workload of the electrical network—generates as a suitable parameter value, or as a modified parameter value, an increased parameter value in relation to the corresponding parameter value for the normal workload and transmits this increased parameter value to the overcurrent protective apparatus.

The central device carries out the check whether—in relation to the respective operating state of the network—a network fault, in particular a short circuit, in an arbitrarily predetermined network section and actuation of one or more protective apparatuses assigned to this faulty network section would lead to a cascaded shutdown of further fault-free network sections, and, if so, to what extent, and optionally the determination of modified parameter values for the respective predetermined network section and/or for other, in particular neighboring, network sections, preferably respectively for all network sections of the electrical network, either simultaneously, with a time overlap or successively.

It is furthermore advantageous that the central device, with the aid of operating data which describe the respective operating state of the electrical network, and with the aid of structure data which describe the technical infrastructure of the electrical network, compiles a simulation model describing the mode of operation and the state of the electrical network and calculates the determination of suitable and/or modified parameter values on the basis of the simulation model.

The central device is preferably connected to the protective apparatuses by a data transmission network, in particular the Internet.

The central device is preferably formed by a computer program of a computer device connected to the data transmission network or a plurality of computer devices cooperating with one another.

The invention furthermore relates to a protective apparatus for protecting a network section of an electrical network.

According to the invention, in relation to such a protective apparatus, it is provided that it contains an interface which permits a readout of parameter values by a central device by means of a data transmission network, in particular the Internet.

In respect of advantages of the protective apparatus according to the invention, reference is made to the comments above in connection with the method according to the invention.

The invention furthermore relates to a central device for monitoring an electrical network.

According to the invention, in relation to such a central device, it is provided that it is formed by a computer device connected to a data transmission network or a plurality of computer devices cooperating with one another, and the computer device or computer devices are programmed in such a way that they read out apparatus-side parameter values from protective apparatuses of the electrical network to be monitored which are connected to the data transmission network.

In respect of advantages of the central device according to the invention, reference is made to the comments above in connection with the method according to the invention.

Other features which are considered as characteristic for the invention are set forth in the appended claims.

Although the invention is illustrated and described herein as embodied in a method for operating an electrical network, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

In the figures, for the sake of clarity the same references are always used for identical or comparable components.

Figure 1:
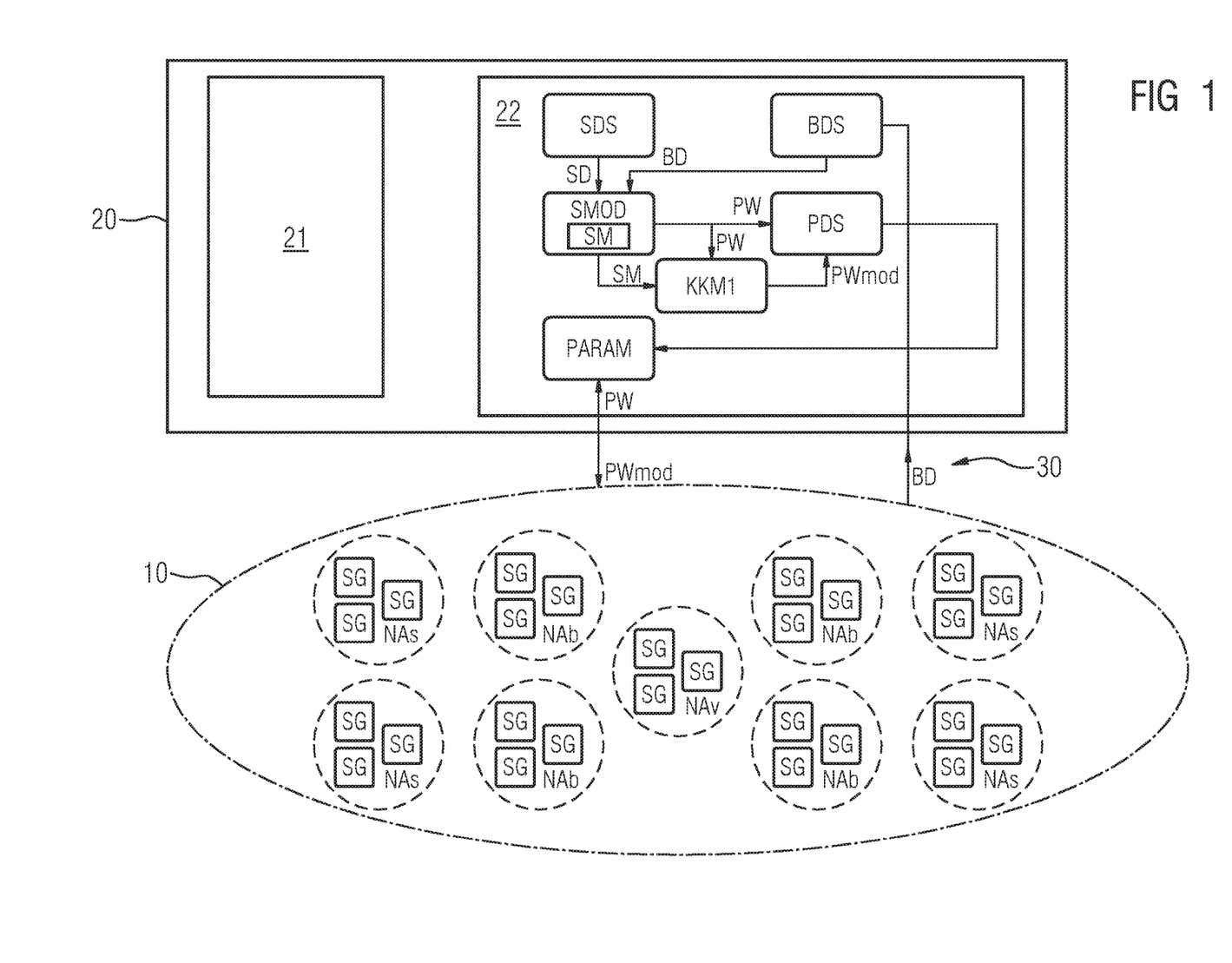
FIG. 1 is an illustration showing a first exemplary embodiment of an arrangement having an electrical network and a central device for monitoring the electrical network, wherein in the first exemplary embodiment it is checked whether the risk of a cascaded shutdown of network sections can be reduced by optimization of parameter values of protective apparatuses of an arbitrarily predetermined network section.

Referring now to the figures of the drawings in detail and first, particularly to FIG. 1 thereof, there is shown a simplified schematic representation of an electrical network 10, in which protective apparatuses SG are connected to a multiplicity of measurement positions (likewise not represented in detail). The protective apparatuses SG respectively monitor an assigned network section of the electrical network 10, or at least a subsection of the respectively assigned network section. The network sections which are monitored by the protective apparatuses SG are denoted in FIG. 1 by the references NAv, NAb and NAs.

The protective apparatuses SG are respectively parameterized with at least one apparatus-side parameter value PW which influences the mode of operation of the respective protective apparatus SG.

The protective apparatuses SG are connected by a data transmission network 30 (only indicated), which may for example be the Internet, to a central device 20 which can read out the protective apparatuses SG in respect of their parameter values PW; the protective apparatuses SG are thus remotely readable. In the exemplary embodiment according to FIG. 1, the protective apparatuses SG are furthermore remotely configurable; this means that the central device 20 can read out and also modify the parameter values PW.

The central device 20 has a computer 21 and a memory 22. Stored in the memory 22, is a multiplicity of data sets as well as a multiplicity of program modules, which determine the mode of operation of the computer 21 and therefore the mode of operation of the central device 20 when run by the computer 21. In the exemplary embodiment according to FIG. 1, the memory 22 contains a structure data set SDS which describes the technical infrastructure of the electrical network 10. The structure data define, for example, the length and properties of electrical lines of the electrical network 10 as well as their electrical connection positions.

Furthermore stored in the memory 22, is an operating data set BDS which contains operating data BD of the electrical network 10. The operating data BD describe the respective operating state of the electrical network 10 and are preferably updated regularly. The operating data BD may for example indicate current and voltage values, load data of consumers and feed data of generators or power plants for the respective positions of the electrical network 10. For real-time updating of the operating data BD, or of the operating data set BDS, measurement data of measuring apparatuses (not further shown) or also measurement data of the protective apparatuses SG may be employed, for example.

The memory 22 furthermore contains a simulation module SMOD, which is suitable for compiling a simulation model SM for simulating the electrical network 10 on the basis of the structure data SD of the structure data set SDS as well as the operating data BD of the operating data set BDS.

On the basis of the simulation model SM, the simulation module SMOD furthermore determines parameter values PW which are suitable for operating the protective apparatuses SG of the electrical network 10 and stores them in a parameter data set PDS of the memory 22.

The parameter values PW contained in the parameter data set PDS are transmitted from a subordinate parameterization module PARAM to the protective apparatuses SG of the electrical network 10, so that parameterization and optionally reparameterization of the protective apparatuses SG is carried out.

Furthermore stored in the memory 22 of the central device 20, is a fault cascade detection module KKM1 which, on the basis of the simulation model SM of the simulation module SMOD, as well as on the basis of the parameter values PW, carries out a check whether—in relation to the respective operating state of the network 10—there is a network fault, in particular a short circuit, in an arbitrarily predetermined network section, for example the network section NAv in FIG. 1, and actuation of one or more protective apparatuses SG assigned to this network section NAv would lead to a cascaded shutdown of other fault-free network sections, in particular neighboring fault-free network sections NAb, or all other or the remaining network sections NAs, and if so to what extent.

If the fault cascade detection module KKM1 establishes that the extent of a cascaded shutdown of fault-free network sections exceeds a predetermined extent threshold, it checks whether modified parameter values PWmod (which are also suitable for operation of the network 10) for the protective apparatuses SG assigned to the predetermined network section NAv would reduce the extent of the cascaded shutdown. If this is the case i.e. a reduction is thus possible, the fault cascade detection module KKM1 transmits the respective modified parameter values PWmod to the parameter data set PDS, or stores them there, so that forwarding of the modified parameter values PWmod to the relevant protective apparatuses SG by the parameterization module PARAM takes place.

If one of the protective apparatuses SG is for example an overcurrent time protective apparatus, which is parameterized by an adjusted overcurrent time span and an adjusted actuation current threshold, the fault cascade detection module KKM1 may in the case of a rise of a load current within a network section of the network 10 initially check whether an increase of the actuation current threshold and/or of the overcurrent time span could provide a reduction of the susceptibility of the network 10 to a blackout situation.

For the adjustment or reparameterization of an overcurrent time protective apparatus, it is then to be taken into account that the respective network section may therefore also be loaded with larger currents, which under certain circumstances could actuate actuation of other protective apparatuses at other positions of the network 10. In this regard as well, it is again necessary to check in turn whether the overall state of the power transmitter network is improved or worsened by a parameter change.

In summary, the central device 20 thus operates in such a way that it regularly or irregularly checks for at least one arbitrarily predetermined network section, here the network section NAv, whether modified parameter values PWmod lead to a lower risk of a cascaded shutdown of fault-free protective apparatuses SG. If this is the case, reparameterization of the protective apparatuses SG of the predetermined network section NAv is carried out.

The compilation of the simulation model SM on the basis of structure data SD and operating data BD is known per se to the person skilled in the art from the field of power supply technology; in this regard reference is made to the relevant literature.

The checking of the degree of risk, or the calculation of the risk, that a fault in one network section could lead to a cascaded shutdown of neighboring network sections or also further network sections (also referred to in the art as a "blackout" problem) is likewise known per se to the person skilled in the art from the field of power supply technology; in this regard reference is again made to the relevant literature.

The computer 21 and the memory 22 moreover need not be localized at a single position; instead, the computer 21 may be formed by a multiplicity of spatially distributed individual computers, and the memory 22 may be formed by a multiplicity of spatially distributed individual memories. The central device 20 may also be produced on a cloud-basis.

Figure 2:
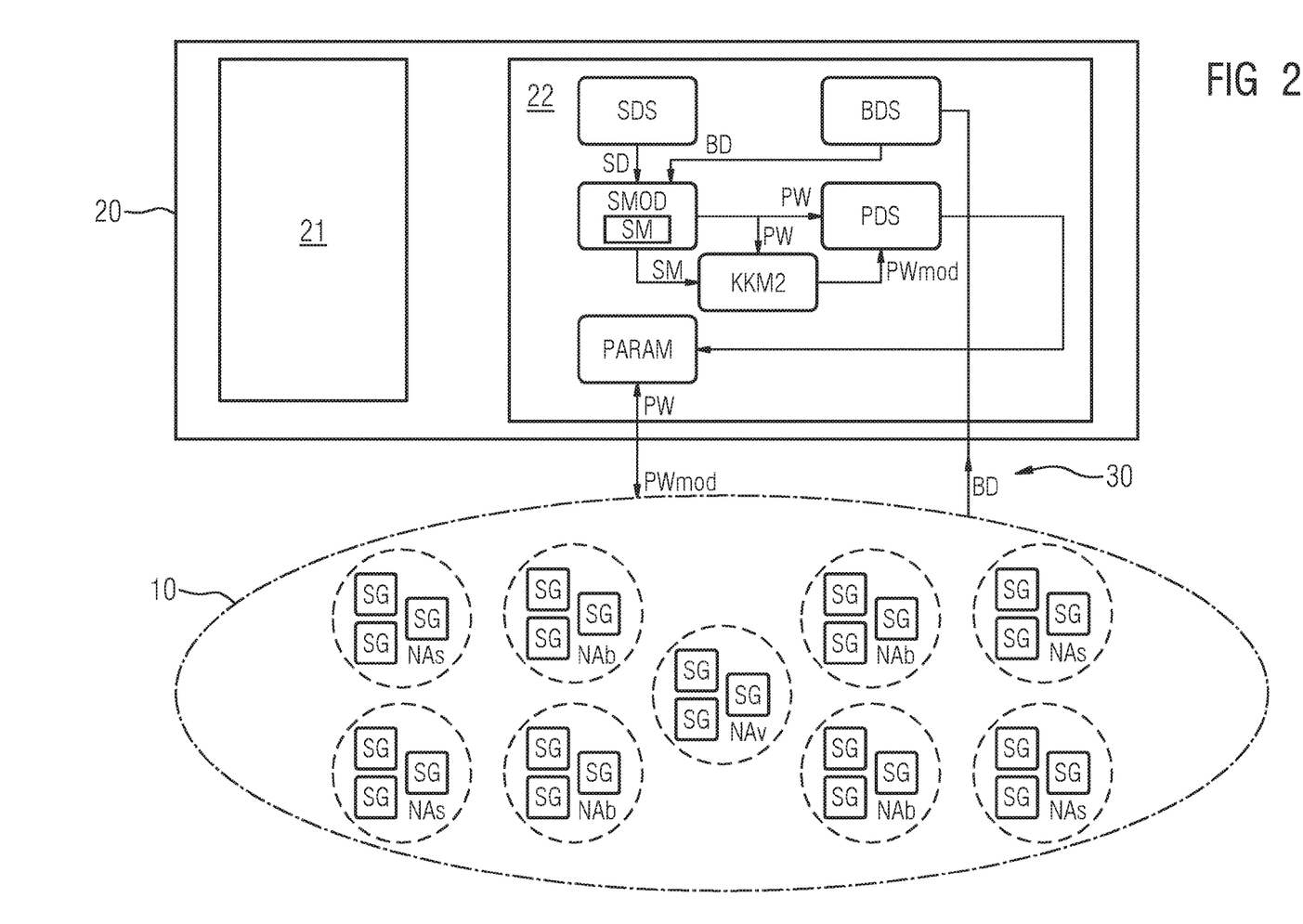
FIG. 2 is an illustration showing a second exemplary embodiment of the arrangement having the electrical network and the central device for monitoring the electrical network, wherein in the second exemplary embodiment it is checked whether the risk of a cascaded shutdown of network sections can be reduced by optimization of parameter values of protective apparatuses of an arbitrarily predetermined network section, as well as network sections neighboring the latter.

FIG. 2 shows another exemplary embodiment of the electrical network 10 and the assigned central device 20. In contrast to the exemplary embodiment according to FIG. 1, the central device 20 according to FIG. 2 contains a fault cascade detection module KKM2 which carries out a check of the parameter values PW and formation of modified parameter values PWmod not only for the protective apparatuses SG of the respectively predetermined network section NAv, but also for the neighboring network sections NAb which neighbor the predetermined network section NAv.

In other words, the central device 20 additionally checks, by means of the fault cascade detection module KKM2, whether modified parameter values PWmod for those protective apparatuses SG which belong to neighboring network sections NAb in relation to the arbitrarily predetermined network section NAv would reduce the extent of a cascaded shutdown of fault-free network sections. If such a reduction is possible, the fault cascade detection module KKM2 determines modified parameter values PWmod for the protective apparatuses SG of the neighboring network sections NAb and reparameterizes the latter by means of the parameterization module PARAM. In respect of the reparameterization, reference is made to the comments above in connection with FIG. 1.

Figure 3:
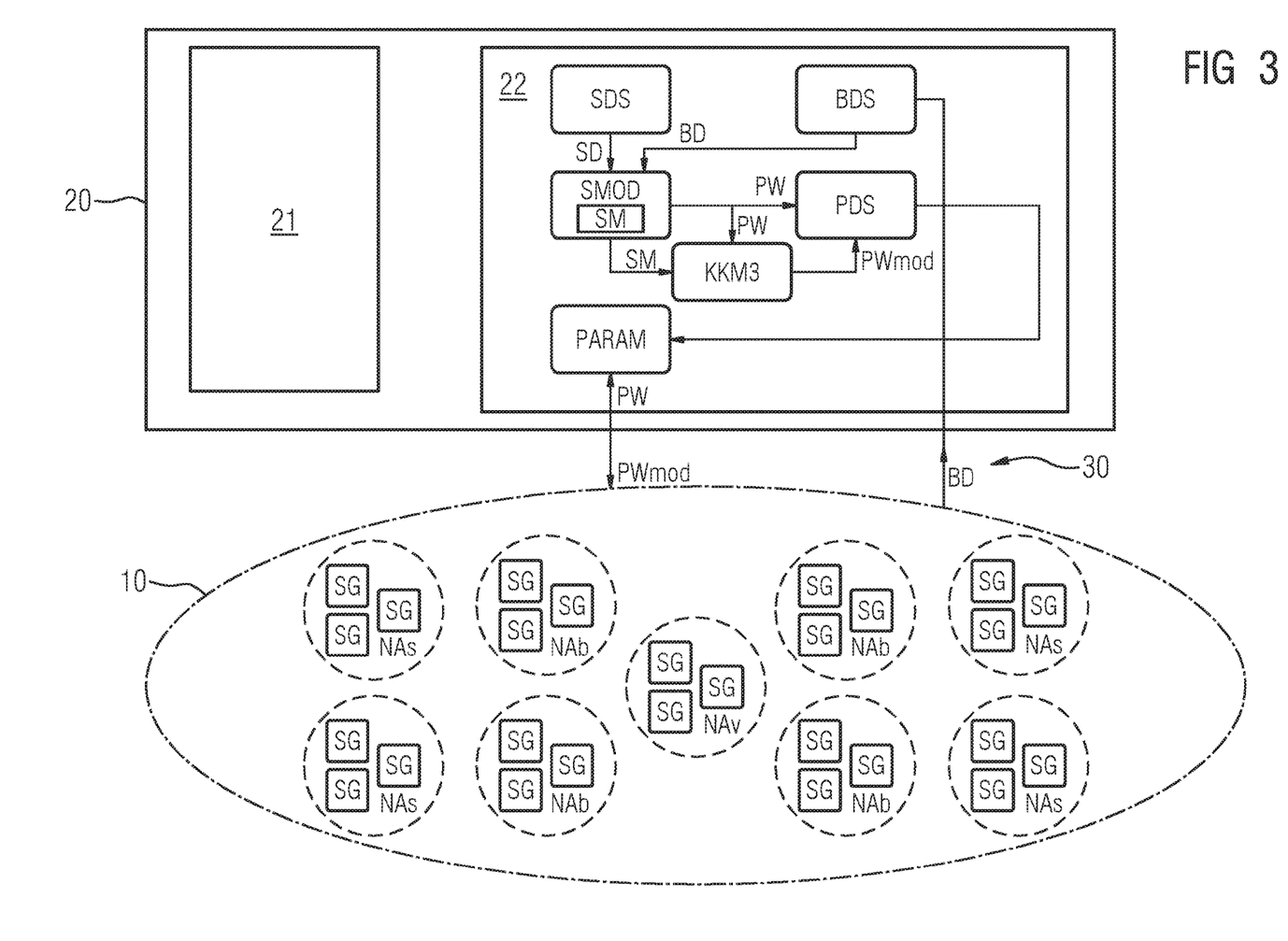
FIG. 3 is an illustration showing a third exemplary embodiment of the arrangement having the electrical network and the central device for monitoring the electrical network, wherein in the third exemplary embodiment it is checked whether the risk of a cascaded shutdown of network sections can be reduced by optimization of parameter values of protective apparatuses of an arbitrarily predetermined network section, as well as neighboring network sections and all other network sections.

FIG. 3 shows another exemplary embodiment of the electrical network 10, which is managed or controlled by the central device 20. In contrast to the exemplary embodiments according to FIGS. 1 and 2, the central device 20 according to FIG. 3 contains a fault cascade detection module KKM3 which, in order to check the risk of a cascaded shutdown of fault-free network sections—in relation to an arbitrarily predetermined network section NAv—takes account of not only this as well as neighboring network sections NAb but also all other network sections NAs of the electrical network 10.

If the fault cascade detection module KKM3 establishes that a reduction of the risk of a cascaded shutdown is possible, it determines modified parameter values PWmod for all protective apparatuses SG in all network sections NAv, NAb and NAs, which are transmitted by the parameterization module PARAM to the relevant protective apparatuses SG for reparameterization thereof. In other regards, the comments above in connection with FIGS. 1 and 2 apply correspondingly.

In connection with the mode of operation of the fault cascade detection modules KKM1, KKM2 and KKM3 of FIGS. 1 to 3, it should be added merely for completeness that a check of the parameter values PW and a determination of the modified parameter values PWmod may be carried out for all network sections of the electrical network 10, by respectively regarding or treating each of the network sections—as described above—at least once as the "predetermined" network section NAv.

In other words, each network section of the electrical network 10 may respectively be a predetermined network section NAv in the sense of the explanations above; accordingly, each network section of the electrical network 10 may, depending on the selection of the predetermined network section NAv, form a neighboring network section NAb or another network section NAs.

The above method for checking the blackout risk may be carried out simultaneously, with a time overlap or successively for each of the network sections as a "predetermined" network section, depending on the available computing power of the computer 21.

It is also advantageous to repeat the check of the blackout risk cyclically, regularly or irregularly, in order to ensure real-time adaptation of the parameter values to changed load and/or feed situations.

The checking and reparameterization may moreover be carried out in a fully automated or semi-automated manner: in the case of semi-automated operation, for example, a display device of the central device 20 may display the respective stability of the network 10, reparameterization being carried out only when this is enabled by an operator. The display may indicate, for example in a traffic-light like manner, a stable network 10 with green, a network 10 at risk in terms of stability with yellow, and an instable network 10 with red.

Figure 4:
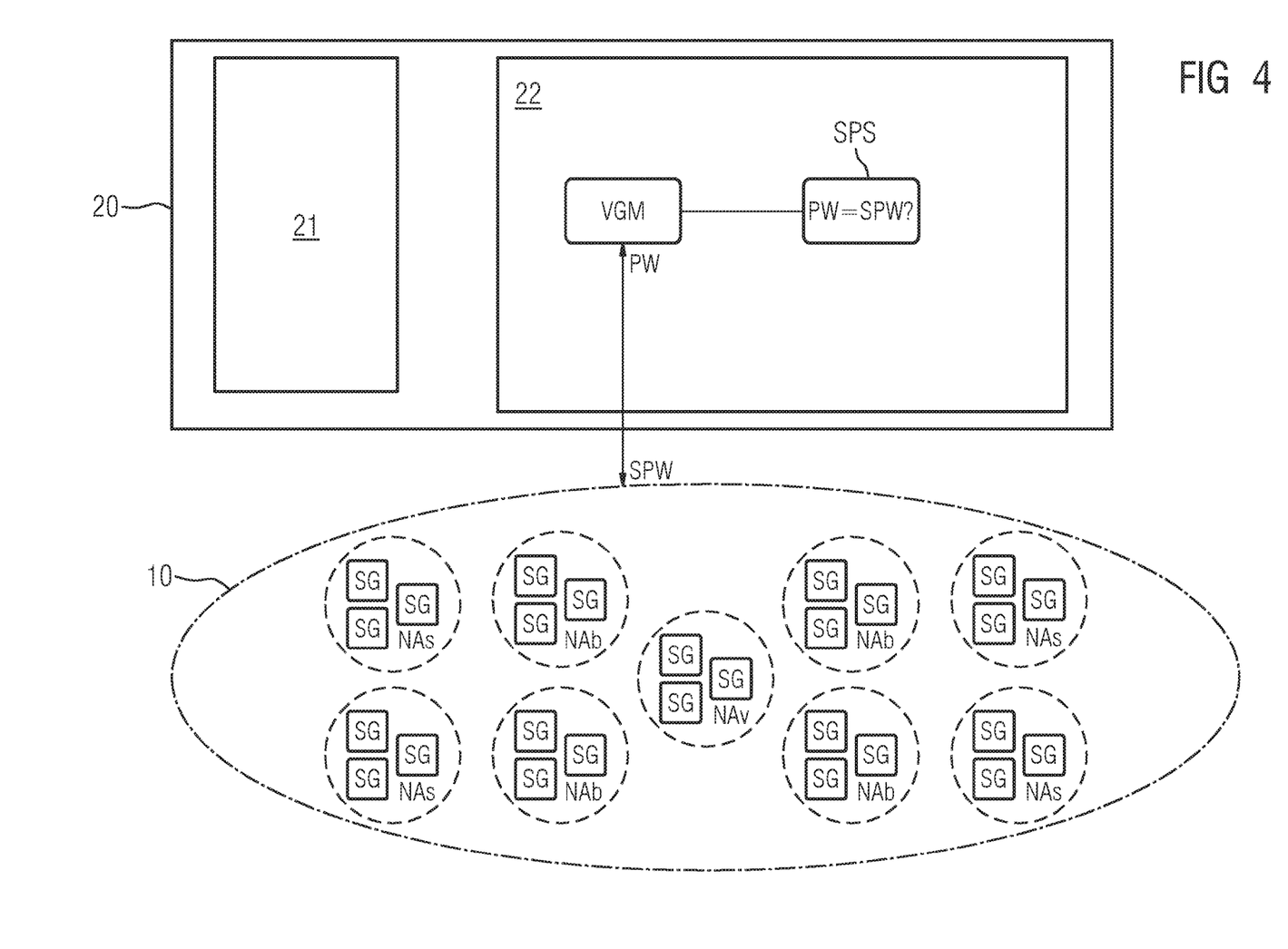
FIG. 4 is an illustration showing a fourth exemplary embodiment of the arrangement having the electrical network and the central device for monitoring the electrical network, wherein in the fourth exemplary embodiment the central device checks parameter values of protective apparatuses and if appropriate changes them by remote parameterization.

FIG. 4 shows another exemplary embodiment of the electrical network 10 and the central device 20, which monitors the electrical network 10 and reads protective apparatuses SG of the electrical network 10. Stored in the memory 22 in the exemplary embodiment according to FIG. 4, is a comparison module VGM which reads out the respective parameter values PW of the protective apparatuses SG of the electrical network 10. The comparison module VGM compares the read-out parameter values PW with setpoint parameter values SPW, which are stored in a setpoint parameter data set SPS of the memory 22. If the comparison module VGM establishes that the read-out apparatus-side parameter values PW differ from setpoint parameter values SPW of the setpoint parameter data set SPS, in the scope of a remote configuration it overwrites the relevant read-out apparatus-side parameter values PW of the protective apparatuses SG with the corresponding setpoint parameter values SPW.

Figure 5:
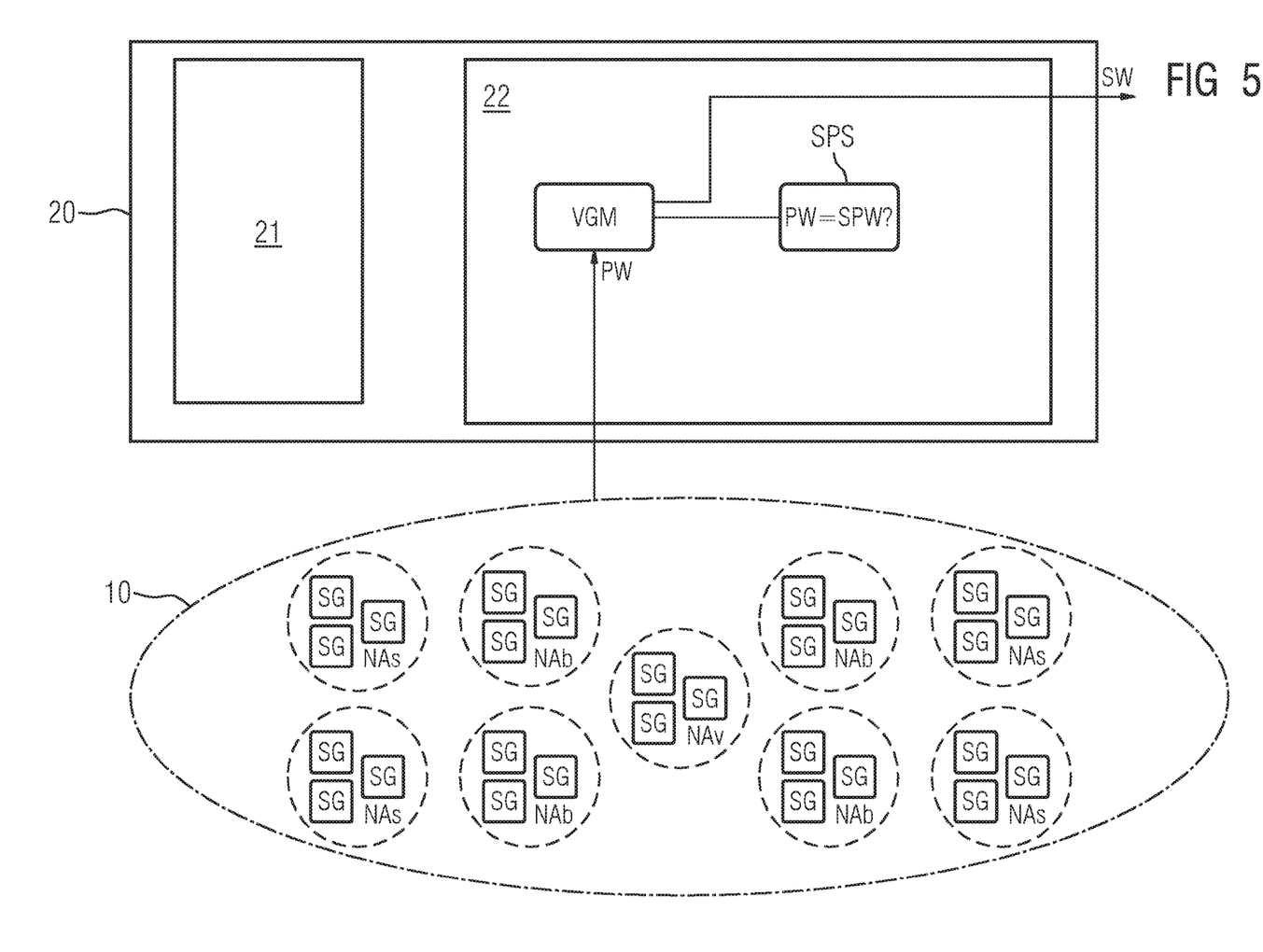
FIG. 5 is an illustration showing a fifth exemplary embodiment of the arrangement having the electrical network and the central device for monitoring the electrical network, wherein in the fifth exemplary embodiment the central device only checks parameter values of protective apparatuses and, in the case of a difference from setpoint parameter values, generates an update signal.

FIG. 5 shows another exemplary embodiment of the electrical network 10 and the central device 20, which cooperates with protective apparatuses SG of the electrical network 10.

Stored in the memory 22 of the central device 20, is a setpoint parameter data set SPS, in which setpoint parameter values SPW for the protective apparatuses SG are stored. A comparison module VGM compares the parameter values PW read out from the protective apparatuses SG with the setpoint parameter values SPW and, in the case of a difference, generates an update signal SW which is output by the central device 20.

If there is such an update signal SW from the central device 20, maintenance staff on site may manually reconfigure or reparameterize the protective apparatuses SG so that the actual parameter values in the protective apparatuses SG correspond to the setpoint parameter values SPW in the setpoint parameter data set SPS of the memory 22 of the central device 20. In other regards, reference is made to the comments above in connection with FIGS. 1 to 4.

Although the invention has been illustrated and described in detail with the aid of preferred exemplary embodiments, the invention is not restricted by the examples disclosed, and other variants may be derived therefrom by the person skilled in the art without departing from the protective scope of the invention.

The following is a summary list of reference numerals and the corresponding structure used in the above description of the invention:

10 electrical network
20 central device
21 computer
22 memory
30 data transmission network
BD operating data
BDS operating data set
KKM1 fault cascade detection module
KKM2 fault cascade detection module
KKM3 fault cascade detection module
NAb network section
NAs network section NAv network section
PARAM parameterization module
PDS parameter data set
PW parameter value
PWmod modified parameter value
SD structure data
SDS structure data set
SG protective apparatuses
SM simulation model
SMOD simulation module
SPS setpoint parameter data set
SPW setpoint parameter values
SW update signal
VGM comparison module

The invention claimed is:

1. A method for operating an electrical network, which comprises the steps of:
connecting protective apparatuses to a plurality of measurement positions, the protective apparatuses monitoring an assigned network section of the electrical network and are respectively parameterized with at least one apparatus-side parameter value which influences a mode of operation of a respective protective apparatus;
remotely reading the protective apparatuses which are connected to a superordinate central device;
reading out, via the superordinate central device, apparatus-side parameter values from the protective apparatuses; and
checking, via the superordinate central device, and with an aid of operating data which describe a respective operating state of the electrical network, with an aid of structure data which describe a technical infrastructure of the electrical network, and with an aid of the apparatus-side parameter values of the protective apparatuses, whether, in relation to the respective operating state of the electrical network, there is a network fault in an arbitrarily predetermined network section and actuation of at least one of the protective apparatuses assigned to a faulty network section would lead to a cascaded shutdown of fault-free network sections, and if so to what extent.

2. The method according to claim 1, which further comprises:
comparing, via the central device, the apparatus-side parameter values read-out with setpoint parameter values for the protective apparatuses; and
generating an update signal when the apparatus-side parameter values differ from the setpoint parameter values.

3. The method according to claim 1, wherein:
the apparatus-side protective apparatuses are remotely configurable; and
the superordinate central device compares the apparatus-side parameter values with setpoint parameter values for the protective apparatuses and, in a scope of a remote configuration, replaces the apparatus-side parameter values with corresponding ones of the setpoint parameter values if the apparatus-side parameters values differ from the setpoint parameter values.

4. The method according to claim 1, wherein with an aid of operating data which describe a respective operating state of the electrical network, and with an aid of structure data which describe technical infrastructure of the electrical network, the superordinate central device determines suitable parameter values for the protective apparatuses and transmits determined suitable parameter values to the protective apparatuses if they differ from the apparatus-side parameter values read-out.

5. The method according to claim 1, wherein:
when a predetermined extent threshold of the extent of the cascaded shutdown is exceeded, the superordinate central device checks whether modified parameter values for at least one of the protective apparatuses assigned to the arbitrarily predetermined network section would reduce the extent of the cascaded shutdown; and
in a case of a reduction of the extent of the cascaded shutdown, the modified parameter values are transmitted to relevant ones of the protective apparatuses for reparameterization.

6. The method according to claim 1, wherein:
when a predetermined extent threshold of the extent of the cascaded shutdown is exceeded, the superordinate central device checks whether modified parameter values for the protective apparatuses which belong to neighboring network sections in relation to the arbitrarily predetermined network section would reduce the extent of the cascaded shutdown; and
in a case of a reduction of the extent of the cascaded shutdown, the modified parameter values determined are transmitted to relevant ones of the protective apparatuses for reparameterization.

7. The method according to claim 1, wherein:
when a predetermined extent threshold of the extent of the cascaded shutdown is exceeded, the superordinate central device checks whether modified parameter values for the protective apparatuses which belong to all other network sections of the electrical network would reduce the extent of the cascaded shutdown; and
in a case of a reduction of the extent of the cascaded shutdown, the modified parameter values determined are transmitted to relevant ones of the protective apparatuses for reparameterization.

8. The method according to claim 1, wherein:
at least one of the protective apparatuses assigned to the arbitrarily predetermined network section is an overcurrent protective apparatus, in which at least one of the apparatus-side parameter values defines a threshold current beyond which the overcurrent protective apparatus is actuated; and
the superordinate central device, in a case of an increased workload in comparison with a normal workload of the electrical network, generates as a suitable parameter value, or as a modified parameter value, an increased parameter value in relation to a corresponding parameter value for the normal workload and transmits the increased parameter value to the overcurrent protective apparatus.

9. The method according to claim 1, wherein the superordinate central device carries out a check whether, in relation to the respective operating state of the electrical network, the network fault in the arbitrarily predetermined network section and actuation of at least one of the protective apparatuses assigned to the faulty network section would lead to a cascaded shutdown of further fault-free network sections, and, if so, to what extent.

10. The method according to claim 1, wherein the superordinate central device, with an aid of operating data which describe a respective operating state of the electrical network, and with an aid of structure data which describe technical infrastructure of the electrical network, compiles a simulation model describing a mode of operation and a state of the electrical network and calculates a determination of suitable and/or modified parameter values on a basis of the simulation model.

11. The method according to claim 1, wherein:
the superordinate central device is connected to the protective apparatuses by means of a data transmission network; and
the superordinate central device is formed by a computer program of a computer connected to the data transmission network or a plurality of computer cooperating with one another.

12. The method according to claim 1, wherein the network fault is a short circuit and the fault-free network sections are neighboring fault-free network sections.

13. The method according to claim 1, wherein:
the superordinate central device carries out a check whether, in relation to the respective operating state of the electrical network, the network fault being a short circuit, in the arbitrarily predetermined network section and actuation of at least one of the protective apparatuses assigned to the faulty network section would lead to a cascaded shutdown of further fault-free network sections, and, if so, to what extent; and
a determination of modified parameter values for a respective predetermined network section, for other neighboring network sections, and/or for all network sections of the electrical network, either simultaneously, with a time overlap or successively.

14. The method according to claim 11, wherein the data transmission network is an Internet.

* * * * *